No. 650,399. Patented May 29, 1900.
W. H. KER.
ROASTED COFFEE PRESERVER.
(Application filed Mar. 20, 1900.)
(No Model.)
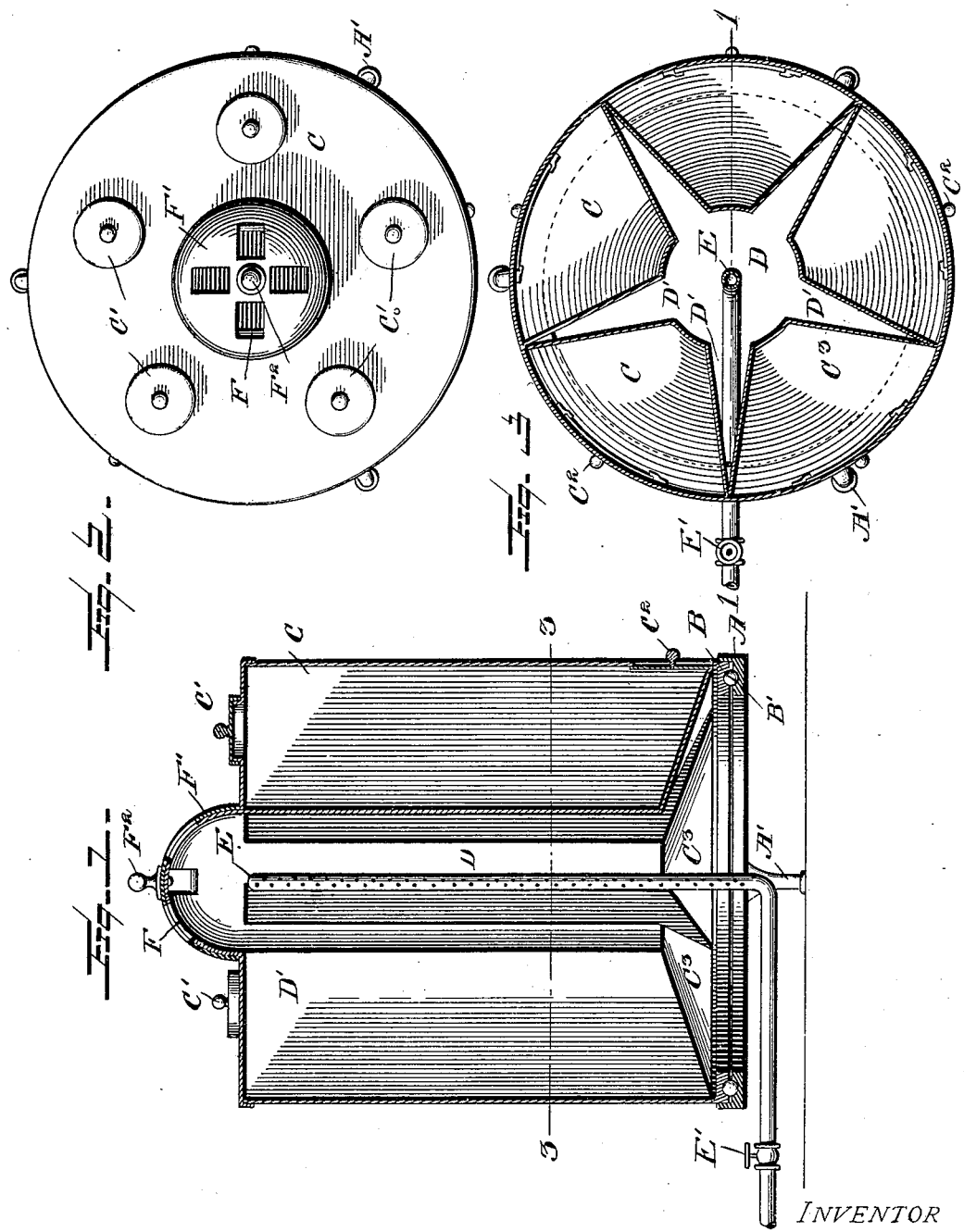
WITNESSES:
INVENTOR
William H. Ker
By E B Stocking
Attorney

UNITED STATES PATENT OFFICE.

WILLIAM H. KER, OF MEMPHIS, TENNESSEE.

ROASTED-COFFEE PRESERVER.

SPECIFICATION forming part of Letters Patent No. 650,399, dated May 29, 1900.

Application filed March 20, 1900. Serial No. 9,420. (No model.)

*To all whom it may concern:*

Be it known that I, WILLIAM H. KER, a citizen of the United States, residing at Memphis, in the county of Shelby, State of Tennessee, have invented certain new and useful Improvements in Roasted-Coffee Preservers, of which the following is a specification, reference being had therein to the accompanying drawings.

This invention relates to a roasted-coffee preserver, and particularly to a construction wherein the bin or compartment containing the coffee may be heated to the necessary extent to retain the coffee in a dry condition.

The invention has for one object to preserve both the aroma and the crispness of the coffee-berry, as well as the strength thereof, by retaining the same in a dry and slightly-warm condition, whereby the berry is prevented from absorbing the moisture and detrimental gases or odors from the surrounding atmosphere.

A further object of the invention is to provide means by which the heat may be properly regulated and a series of compartments rendered quickly available for the dealer dispensing different grades of coffee.

Other objects and advantages of the invention will hereinafter appear in the following description, and the novel features thereof will be particularly pointed out in the appended claims.

In the drawings, Figure 1 represents a vertical cross-section through the invention. Fig. 2 is a top view thereof, and Fig. 3 is a horizontal section on the line 3 3 of Fig. 1.

Like letters of reference indicate like parts throughout the several figures of the drawings.

In the drawings, the letter A represents a base-plate supported in any suitable manner—for instance, by means of legs A'—upon which there is supported a movable plate B. The easy rotation of these parts may be effected by any desired means—for instance, the bearing-balls B', traveling in suitable ways in the plates A and B. Supported from the movable plate B is a series of compartments or bins C, adapted to receive coffee or other material to be stored. These are to be provided with suitable filling-openings C' at their upper portions and delivery means C² at the lower part and are arranged circumferentially of a central space D. The walls of the compartments also taper inwardly toward each other providing a series of heat-spaces D' at each side of the bins, and the lower walls C³ of the bins are tapered upwardly, thus exposing the same to the heat. The outer walls of the several bins or compartments are shown as curved, so that in the completed device the outer wall or periphery is circular, although it may be of any other desired configuration. For the purpose of supplying the necessary heat a heating device E—for instance, a burner, as shown—is located within the space D, and the control of the heating fluid therethrough may be effected by means of a suitable valve E'.

In order to more thoroughly regulate the degree of heat for the purpose of retaining the material in a dry condition, the upper portion of the chamber D has been provided with outlet-openings F for the escape of heat, over which a suitable damper F' is adapted to be operated by means of a handle F². By closing this damper it will be seen that the heat will be confined within the spaces D and D', thus thoroughly drying the material in the bins C.

It will be seen that the structure herein provided permits access of the heat to the side walls and bottom of the compartment or bin, thus maintaining the same at the proper temperature for the preservation of the coffee in a crisp or fresh condition, and the degree of heat can at any time be regulated to effect the desired drying action. This is particularly desirable where the coffee has been stored in a moist place and absorbed moisture, which may be driven therefrom by placing the same in the preserving device and removing the filling-caps C' to allow the escape of the moisture when the temperature of heat is sufficient to drive the same from the coffee. By this invention a dealer is enabled to retain his coffee in the fresh-roasted condition which, as is well known, is extremely desirable, as there is a constant demand for freshly-roasted coffee. The number of compartments or bins may be increased or diminished, as desired, and as each is separate and independent from the others it is obvious that different grades of coffee or other materials may be stored therein. The heating device as shown herein consists of a perforated burner adapted for the consumption of gas; but the same may be altered, if found desirable, by the introduction of any other suitable form of heating device. The sliding discharge-doors C' herein shown have been found very desirable for the purpose of discharging coffee from the inclined bottom C³ of the bin; but any other form of door or closure may be applied.

The device as a whole furnishes a very attractive article of store furniture and may be conveniently rotated, so that the dealer can obtain access to any one of the bins or compartments without inconvenience.

Having described my invention, what I claim is—

1. A coffee-preserver comprising a series of bins or compartments having their side walls separated from each other and a central heating-chamber at the inner ends of said bins, and a heating device located within said chamber; substantially as specified.

2. A coffee-preserver comprising a series of bins or compartments having the side walls separated from each other and central heating-chamber at the inner ends of said bins, a heating device located within said chamber, and a heat-regulating damper at the upper portion of said chamber; substantially as specified.

3. A coffee-preserver comprising a series of bins or compartments having the side walls separated from each other and a central heating-chamber at the inner ends of said bins, a heating device located within said chamber, a heat-regulating damper at the upper portion of said chamber, and means whereby said compartments may be rotated upon their base or support; substantially as specified.

4. In a coffee-preserver, the combination of a support, a plate rotatable thereon, a series of bins or compartments disposed radially to the center of said base and having separated walls, and a heating device at substantially the radial center of said bins; substantially as specified.

5. In a coffee-preserver, the combination of a base and supporting-plate rotatable thereon, a series of bins supported upon said plate and having their side walls inclined inwardly toward each other to provide a central heating-space with radiating-chambers extending between the bins, a regulating-damper at the upper portion of said heating-space, and a burner within said space; substantially as specified.

In testimony whereof I affix my signature in presence of two witnesses.

WILLIAM H. KER.

Witnesses:
P. P. GLUCK,
C. P. MARSHALL.